Sept. 8, 1964

J. P. KING 3,148,249

ATTACHMENT FOR TELEPHONE MOUTHPIECE

Filed Feb. 5, 1962

INVENTOR.

JOHN P. KING

BY Barlow & Barlow

ATTORNEYS

United States Patent Office 3,148,249
Patented Sept. 8, 1964

3,148,249
ATTACHMENT FOR TELEPHONE MOUTHPIECE

John P. King, 24 Wood St., Providence, R.I.

Filed Feb. 5, 1962, Ser. No. 171,080
2 Claims. (Cl. 179—185)

This invention relates to an attachment to a telephone mouthpiece, more particularly to a telephone handset in which there is a unit having a receiver at one end and a transmitter at the other, the attachment being designed particularly for the mouthpiece at the transmitting end of the handset, although because of the similarity of shape of the receiver, it might also be attached thereto.

One of the objects of the invention is to provide an attachment which will provide sanitation for the mouthpiece by reason of the carrying of a germicide.

Another object of the invention is to provide an attachment having the germicidal carrying element which may be replaced as occasion may require.

Another object of the invention is to provide an attachment which may be easily attached to or removed from the mouthpiece of a telephone, and when so removed, may afford easy replacement of a germicidal carrying element.

Another object of the invention is to provide an element which will stretch across the mouthpiece of a telephone but which will not intefere with the transmission of the voice into the telephone.

Another object of the invention is to provide an attachment which may be easily molded from plastic material and which will be light in weight so as not to destroy the balance of the hand unit to which it is attached.

With these and other objects in view, the invention consists of certain novel features of construction as will be more fully described and particularly pointed out in the appended claims.

Figures 1, 2, 3, 4:
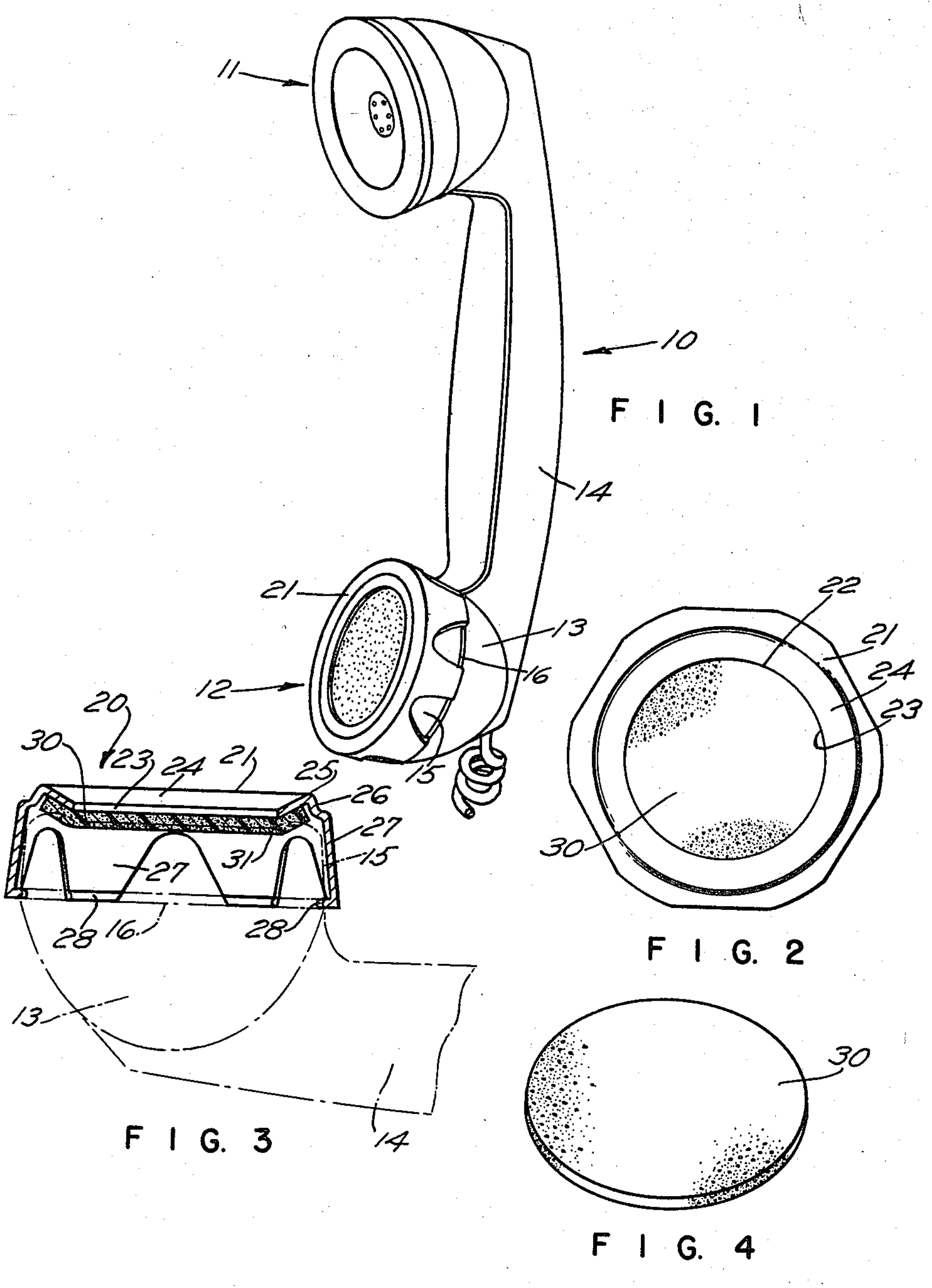
FIG. 1 is a perspective view of a hand unit of a telephone illustrating my attachment as secured thereon.
FIG. 2 is a plan view of the attachment with the disk therein.
FIG. 3 is a sectional view of the attachment holding the germicidal disk in position therein in the position assumed when held in the telephone mouthpiece and showing the hand unit in phantom.
FIG. 4 is a perspective view of the disk part of the attachment alone.

In proceeding with this invention, I have provided an annular body with a plurality of arms extending at generally right angles to the plane of the body which arms are so shaped that they may clip on to the mouthpiece of a telephone while the annular body contains a disk of sponge-like material which will carry a germicide and bridge the opening in the body and completely cover the mouthpiece of the telephone. Thus, as one talks into the telephone, the disk carrying the germicide will intercept any particles or germs which may be ejected from the mouth so as to catch them in this disk and permit action of the germicide carried by the disk to destroy any germs which may be in the excretion from the mouth.

With reference to the drawings, 10 designates generally the hand instrument of the telephone having a receiver device 11 at one end and a transmitting device 12 at the other end. This transmitting device is provided with a generally bulbar surface 13 as it projects from the hand portion 14 of the handset and then is tapered as at 15 with a groove 16 between the tapered portion and the bulbous portions 13. This tapered portion is itself removable from the handset. At the end of the removable tapered portion, there is a generally circular surface which is depressed somewhat inwardly from its marginal edge and provided in its depressed area with a plurality of openings for the transmission of the voice.

The attachment is designated generally 20 and comprises an annular body 21 having an open center 22 and is formed of substantially uniform thickness of a suitable material and extends from its inner edge 23 forming the edge of the opening 22 upwardly as at 24 as it progresses outwardly and then is arcuate as at 25 and extends downwardly again as at 26 and outwardly in something of an ogee curve, and from this shape of body there extends arms 27 which flare outwardly somewhat substantially along the line of the taper 15 of the transmitting unit 12. Each arm terminates with an inward projection 28 which is of a size and shape to enter the groove 16 in the transmitting instrument and together these serve to clip the unit 20 securely on the transmitting device 12. This unit 20 may be of metal or plastic.

A disk 30 of sponge-like material, such as foamed polyurethane, is located within the body 21 of this attachment 20 so as to span the opening 22 and cover the surface of the transmitter and is held securely against the transmitter by reason of the edge 23 with its projecting corner 31 contacting and indenting and compressing the disk slightly and sufficiently so as to obtain a good grip on the disk to hold it against the transmitter or mouthpiece of the handset. Usually this disk is contained within the body of the attachment 20 inwardly of the arms 27 thereof and is positioned in the attachment prior to snapping the attachment on to the transmitter where it will be bound in position as above described. It is desirable to change disks occasionally, and it is merely necessary to twist and pull at the same time to remove the attachment from the transmitter, then the disk may be removed and a fresh one put in place, and the attachment again snapped in position.

Various germicides serving to kill germs that may be lodged on the disk may be utilized, but I have found that a very effective germicide is that known on the market under the name "Permachem," which may be applied to the foam disk to be carried thereby. This germicide is preferably applied to the disk before the disk is placed on the attachment 20 and before the attachment is applied to the transmitter although it may be applied to the disk at anytime.

I claim:

1. An attachment for a telephone mouthpiece comprising a body in the form of an open annulus, a plurality of arms extending from said body in a direction at right angles to the plane of said annulus and shaped to grip the mouthpiece of a telephone, and a disk of a compressible material capable of carrying a germicide bridging the opening in said annular body, said annulus being provided with an annular flange inclined inwardly so that its lower inner edge grips said disk along a circular line which line compresses said disk and serves to bind the disk against the surface of the mouthpiece of the telephone when said arms are in a position to grip said mouthpiece.

2. An attachment as in claim 1 wherein flange has a right angular edge providing a corner and the corner of the inner edge engages said disk to indent itself therein.

References Cited in the file of this patent

UNITED STATES PATENTS

| | | |
|---|---|---|
| 1,834,199 | Barr | Dec. 1, 1931 |
| 2,078,877 | Hoyland | Apr. 27, 1937 |
| 2,593,382 | Zimmermann | Apr. 15, 1952 |
| 2,938,967 | Guardino | May 31, 1960 |

FOREIGN PATENTS

| | | |
|---|---|---|
| 755,426 | France | Nov. 24, 1933 |